US005155480A

United States Patent [19]

Pfeiffer

[11] Patent Number: 5,155,480

[45] Date of Patent: Oct. 13, 1992

[54] EVENT REPORTING USING A TWO-WIRE NON-BLOCKING BUS STRUCTURE

[75] Inventor: Greg C. Pfeiffer, Bloomington, Minn.

[73] Assignee: ADC Telecommunications, Inc., Minneapolis, Minn.

[21] Appl. No.: 634,758

[22] Filed: Dec. 27, 1990

[51] Int. Cl.[5] .............................................. H04Q 1/00

[52] U.S. Cl. .......................... 340/825.06; 340/825.12; 340/825.36; 340/825.57; 340/870.09; 340/506; 340/508; 370/85.9

[58] Field of Search ...................... 340/825.06, 825.36, 340/825.57, 825.77, 517-521, 506, 505, 504, 512, 825.5, 508, 825.12, 870.09; 370/85.185.9; 379/42, 39, 47, 49, 50, 106, 107

[56] References Cited

U.S. PATENT DOCUMENTS

| | | | |
|---|---|---|---|
| 3,435,145 | 3/1969 | Pinualt et al. | 340/506 |
| 3,688,296 | 3/1972 | Donohue et al. | 340/506 |
| 4,091,384 | 5/1978 | Green | 340/506 |
| 4,117,479 | 9/1978 | Galvin et al. | 340/506 |
| 4,610,012 | 9/1986 | Terada et al. | 340/521 |
| 4,740,787 | 4/1988 | Kimura | 340/825.12 |
| 4,752,698 | 6/1988 | Furuyama et al. | 340/506 |
| 4,782,481 | 11/1988 | Eaton | 370/85.1 |

OTHER PUBLICATIONS

Schematic 2-42932-1382.
Schematic 2-42933-4018.

*Primary Examiner*—Donald J. Yusko
*Assistant Examiner*—Brian Zimmerman
*Attorney, Agent, or Firm*—Merchant, Gould, Smith, Edell, Welter and Schmidt

[57] ABSTRACT

An apparatus for non-blocking event reporting from event reporting units to a monitoring circuit includes a first and second common wire coupling the units to the monitoring circuit. A constant level signal is generated on the first wire and a pulse signal is generated on the second wire. The monitoring circuit detects the level and pulse signals and reports multiple overlapping events occuring at the event reporting units.

6 Claims, 3 Drawing Sheets

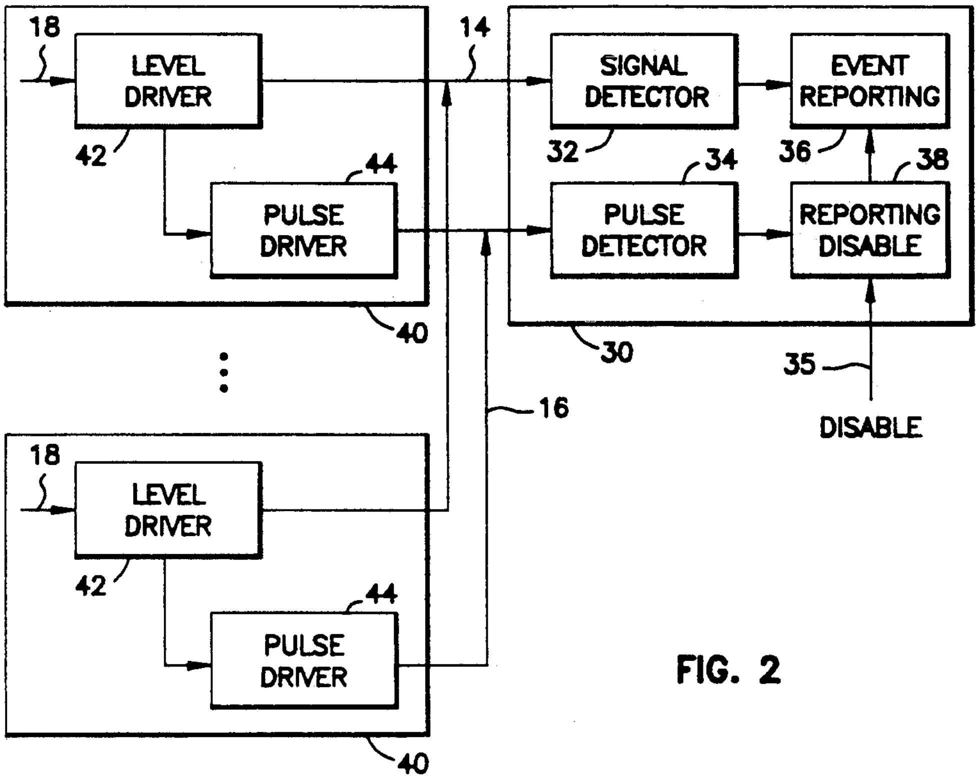
FIG. 2
FIG. 3
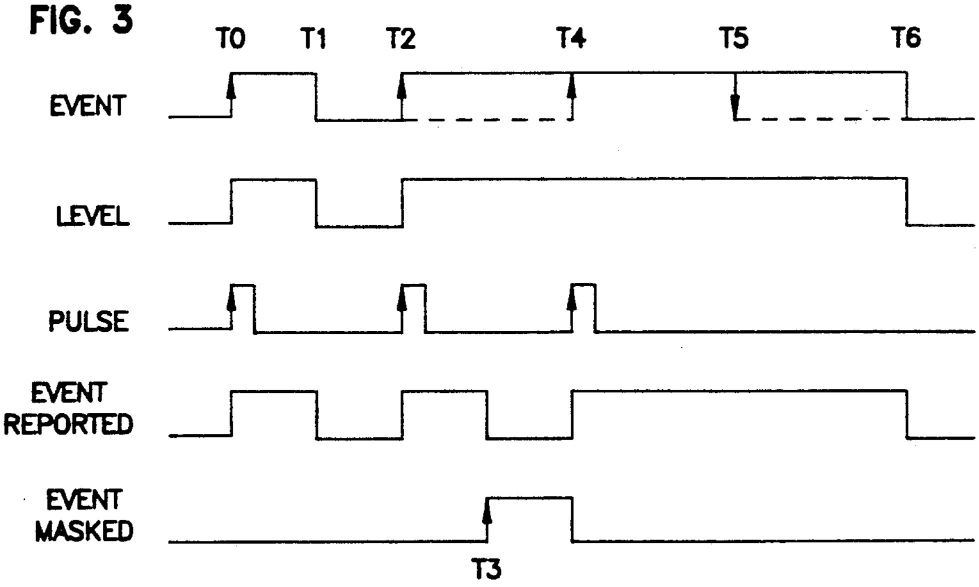

EVENT REPORTING USING A TWO-WIRE NON-BLOCKING BUS STRUCTURE

FIELD OF THE INVENTION

This invention relates generally to telecommunication systems. More particularly, this invention relates to bus structures utilized for event reporting from a plurality of event reporting units in a telecommunications system.

BACKGROUND OF THE INVENTION

In event reporting systems using a common single wire signalling bus, the bus is blocked by the first reported event, thus preventing the reporting of subsequent events. This problem is avoided in discrete non-blocking schemes which use a separate wire for each event reporting unit within the system. However, this approach requires a much larger number of wires and entails greater complexity and expense than the single wire bus structure. Accordingly, there exists a demand for a non-blocking common bus event reporting system.

SUMMARY OF THE INVENTION

The present invention provides method and apparatus for non-blocking event reporting from a plurality of discrete event reporting units to a monitoring circuit by means of a two-wire common bus structure. The apparatus comprises a first common wire and a second common wire coupling the units to the monitoring circuit which detects reported events. When an event, such as an alarm, is detected at a unit, the unit immediately applies a constant signal to the first common wire. Simultaneously, the unit applies a pulse signal to the second common wire. The monitoring circuit receives the constant signal and the pulse signal. If a second unit detects an event while the first unit is signalling the existence of an event on the first wire, the monitoring circuit will detect the signalling of the second event via the pulse sent by the second unit even though the second unit is "blocked" from reporting the event over the first wire. Thus, the monitoring circuit has the means for detecting multiple overlapping events using the two-wire system of the present invention.

In a further embodiment of the invention, the monitoring circuit includes an alarm means for alerting an attendant when an event has been reported. If the alarm means is disabled by the attendant, a subsequently received pulse signal reactivates the alarm means to alert the attendant that another event has been reported.

BRIEF DESCRIPTION OF THE DRAWINGS

FIG. 2 is a block diagram of an event reporting scheme with a two-wire non-blocking bus structure utilized in the equipment of FIG. 1;

FIG. 3 is a timing diagram of the event reporting scheme of FIG. 2;

DETAILED DESCRIPTION OF THE INVENTION

In the following detailed description Of the invention, references are made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
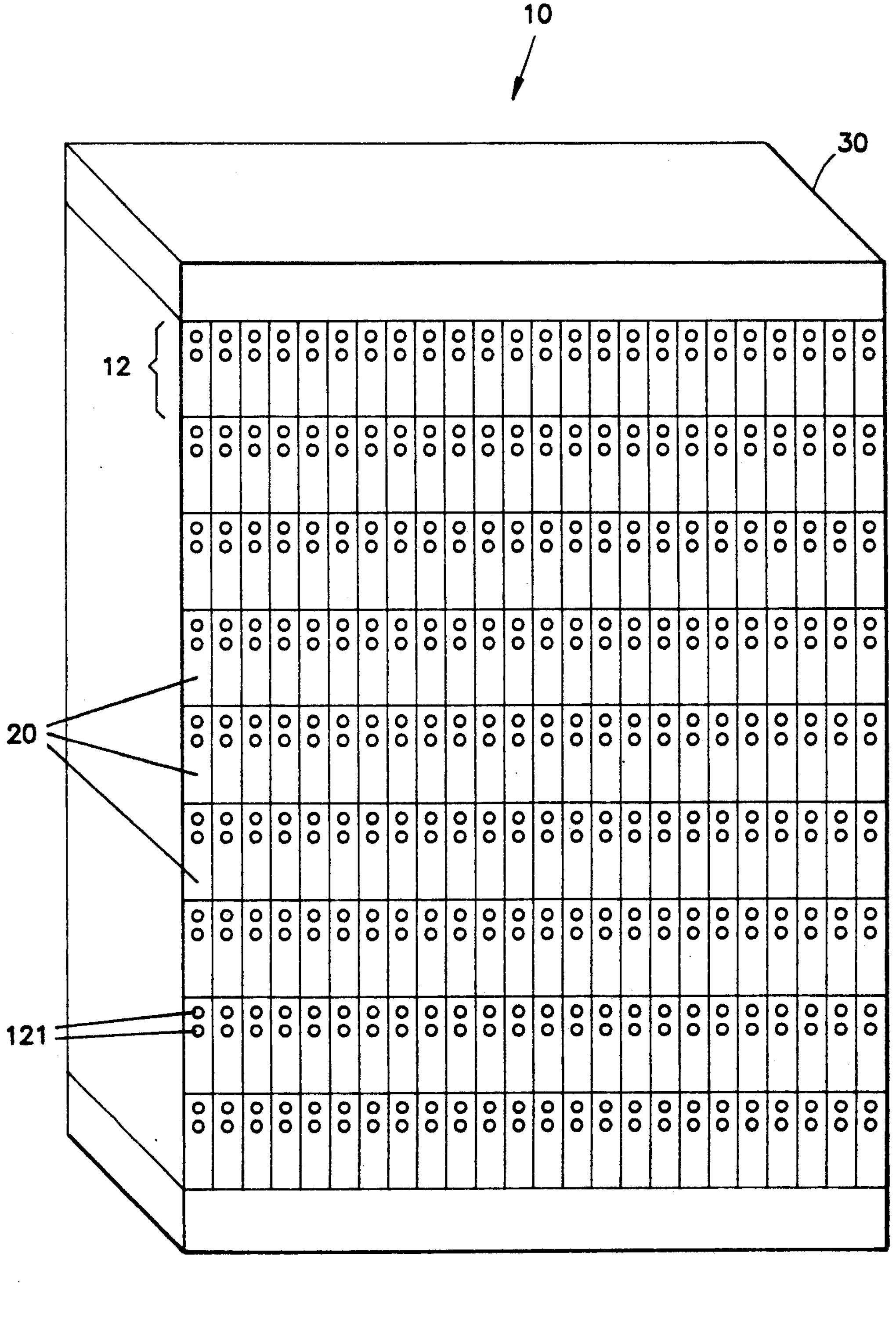
FIG. 1 shows a perspective view of shelves of event reporting telecommunication units utilized in a telecommunication system.

The present invention describes a non-blocking event reporting scheme with a two-wire bus structure. It is useful in telecommunication systems where many telecommunications modules, or units, must report events to a commonly shared monitoring circuit. As shown in FIG. 1, telecommunications equipment 10 may include several shelves 12 holding modules 20. These shelves of modules may include, for example but without limitation thereto, repeater modules to provide extended distance capabilities or cross-connect modules to provide cross-connect capabilities. The common monitoring circuit 30 monitors the reporting of events from modules 20. The two-wire bus structure of the present invention provides a non-blocking event reporting scheme to report events from the modules 20 to the monitoring circuit 30. The monitoring circuit 30 alerts an attendant that an event has occurred at a module 20 by, for example, sounding an alarm or lighting an LED.

FIG. 2 shows a block diagram of the non-blocking event reporting scheme of the present invention. A module 20 of the communications equipment 10 includes a logic circuit responsive to event occurrences. When an event occurs, the logic circuit generates an event signal 18 which is applied to a driver section 40 of the module 20. The monitoring circuit 30 is coupled to the driver section 40 of the modules 20 via a two-wire bus structure. A first wire 14 couples a constant level signal driver 42 of the driver section 40 of each module 20 to a signal detector 32 in the monitoring circuit 30. A second wire 16 couples a pulse driver 44 of each module 20 to a pulse detector 34 in the monitoring circuit 30. Another wire serving as a ground or signal return is also employed. Event reporting logic 36 detects and signals the occurrence of events reported by the modules, for example by sounding an alarm. The alarm may be disabled by a signal 35 applied to reporting disable logic 38, which in turn is connected to event reporting logic 36.

The operation of the non-blocking event reporting scheme utilizing the two wires, 14 and 16, shall be explained with reference to FIG. 2 and the timing diagram of FIG. 3. When a single module event occurs at T0, evidenced by an event signal 18 at the input of the level driver 42, the constant level signal driver 42 drives a constant level signal on the first wire 14. Driver 42 also drives a pulse driver 44 providing a pulse signal on line 16. The signal detector 32 and pulse detector 34 receive the level and pulse signal and an event is reported via event reporting logic 36. A constant level signal is reported. When the event occurrence at the module terminates at T1, event reporting logic 36 no longer represents that an event is occurring. This single module event only requires that a level signal be transmitted and therefore only a single wire bus is required. However, if a second module event occurs from T4 to T6 while a first event is active from T2 to T5, it is not possible to differentiate between those event occurrences with a single wire bus.

In the present invention, at T2 the first event applies a constant level signal on the first wire 14 and a pulse signal on the second wire 16. This event is reported by event reporting logic 36. Event reporting logic 36 alerts an attendant that an event has taken place, such as by an audible alarm or an LED. The audible alarm reporting the event can be manually disabled by the attendant via signal 35, as at T3. The event occurrence at T4 by a second module once again produces a constant level signal on the first wire 14 and a pulse signal on the second wire 16. Because the first wire 14 is blocked by the presence of the signal from the still active first event, the signal detector 32 fails to recognize the second event. However, the pulse signal generated on the second wire 16 is detected by the pulse detector 34 of the monitoring circuit 30 so that the second event is recognized by event reporting logic 36. This second event overrides the manual disablement of event reporting logic 36 which occurred at T3, so it is reactivated to the alarm state. Although the first event terminates at T5, the second event lasts until T6 thereby maintaining the event reporting until disabled or the event occurrence terminates. Thus, the two-wire bus structure allows for non-blocking event reporting with a minimum number of wires. The particular unit reporting the event can most often be identified by a corresponding indicator light showing on its front panel.

Figure 4:
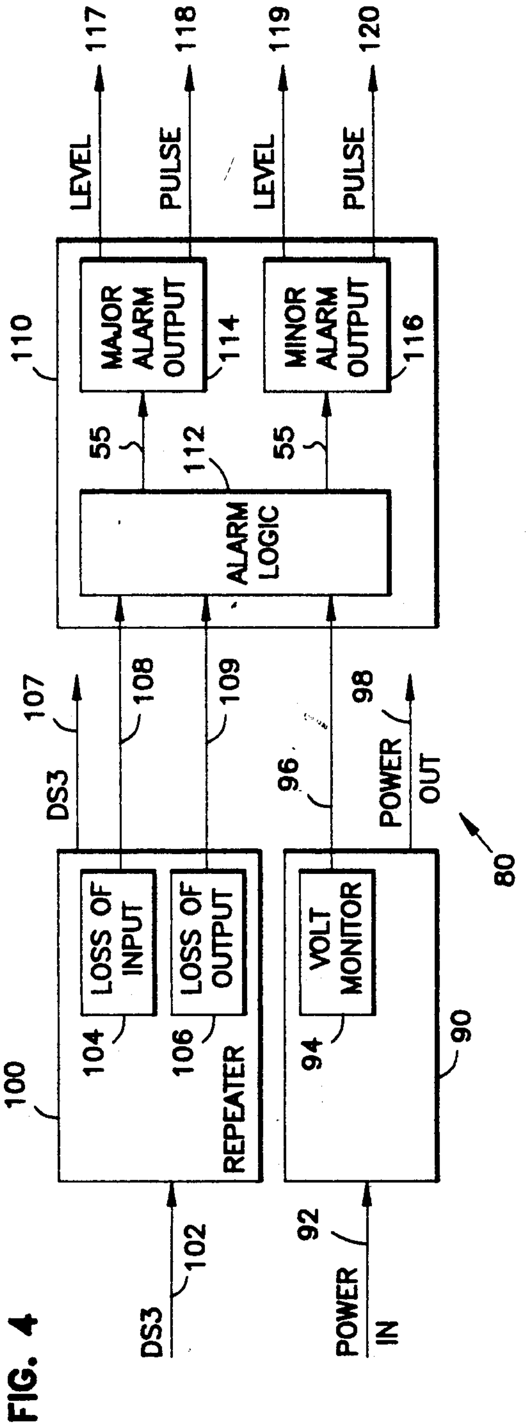
FIG. 4 is a block diagram of the implementation of a non-blocking event reporting scheme for use with a DS3 repeater.
Figure 5:
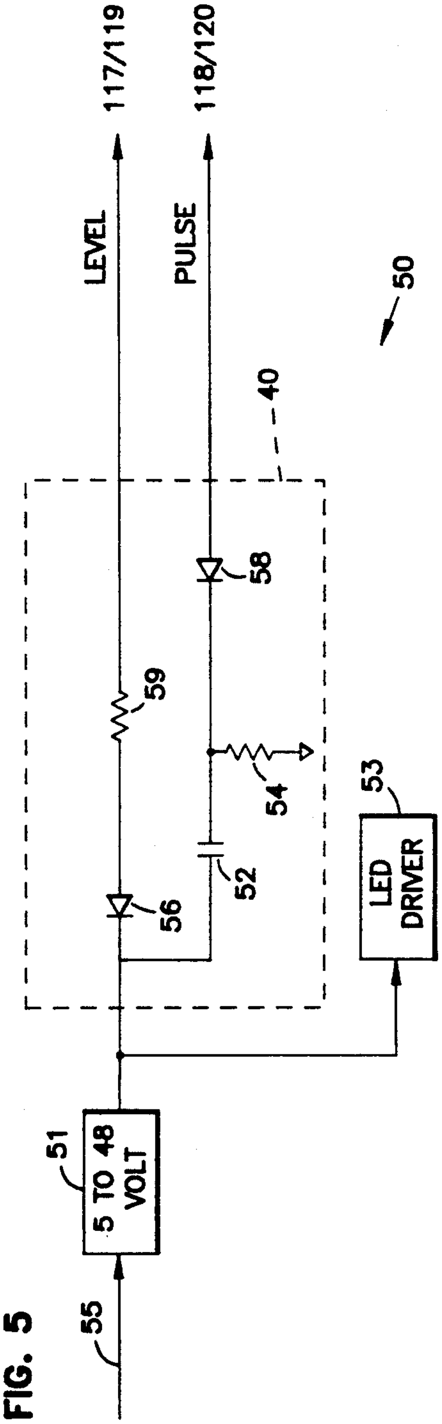
FIG. 5 is a block and schematic diagram of the two-wire bus structure of the present invention utilized in the DS3 repeater of FIG. 4.

FIG. 4 and FIG. 5 together show an embodiment of the present invention implementing the two-wire bus structure of a non-blocking alarm scheme in a DS3 repeater module. This DS3 repeater module is just one of a number of repeater modules that in a typical application would be coupled to a monitoring circuit via the two-wire bus structure. FIG. 4 shows a block diagram of the repeater module. A DS3 signal 102 is applied to repeater circuit 100 and an amplified, repeated DS3 signal 107 is produced. Because of the great number of data streams in the DS3 signal, it is important to detect alarm conditions occurring at the different modules quickly so that the alarm conditions can be remedied before too much capacity is lost. The repeater circuit 100 includes a loss of input monitor 104 and a loss of output monitor 106 for reporting the loss of input and loss of output, 108 and 109, to alarm circuit 110. The module further includes a power circuit 90 receiving input power 92 and producing output power 98. Power circuit 90 has a voltage monitor circuit 94 for reporting loss of power 96 to alarm circuit 110. Alarm circuit 110 includes alarm logic 112, major alarm output circuit 114, and minor alarm output circuit 116.

Depending upon the alarm conditions present, alarm logic 112 applies an alarm signal 55 to either the major alarm output circuit 114 or the minor alarm output circuit 116. A major alarm is reported if there is a loss of power 96, a loss of output signal 109 in the presence of an input signal, or other board failures. A loss of input alarm signal 108 would only cause a minor alarm to be triggered.

The major alarm output circuit 114 and the minor alarm output circuit 116 are both implemented by circuit 50 shown by the schematic and block diagram of FIG. 5. Alarm signal 55, indicating that an alarm is active or inactive, is applied to a 5 to 48 volt logic circuit 51. Although the preferred embodiment is referenced to −48 volt level, any other suitable voltage level will work. For example, alarm signal 55 could be applied directly to the driver section 40 with an appropriate change in the monitoring circuit 30. When an alarm event is reported, a constant alarm level signal is carried at the level output, 117 or 119, and applied on the first wire. The level signal is also applied to an LED driver 53 to light LED's 121 on the front of the repeater modules (shown in FIG. 1). The constant alarm level signal drives an R/C integrator to create a pulse on the second wire and at the pulse output, 118 or 120. The R/C integrator consists of capacitor 52 and resistor 54. This pulse output can be produced by a digital one shot as opposed to an R/C integrator if the bus structure is utilized in a high speed design.

Isolation diodes 56 and 58 isolate their respective buses at the repeater module to prevent loading from other modules. Resister 59 is only necessary to provide electrostatic discharge protection. The pulsed output allows detection of the leading edge of a multiple number of alarms sharing a common bus. However, detection can be based on the trailing edge of the alarm signal instead of the leading edge.

Therefore, an alarm system is provided in a DS3 repeater module which produces either a major or minor output alarm signal. The major or minor alarm signal is reported by means of a constant level signal output, 117 or 119, and a pulse signal output, 118 or 120, upon a first wire and a second wire, respectively, to a common monitoring circuit which reports the alarm event. The reporting, disablement, and overriding the disablement of the alarm has been described previously with regards to FIG. 2 and 3.

Although the present invention has been described above in a preferred form those skilled in the art would readily appreciate that various modifications may be made to it without departing from the spirit and scope of the invention, as bounded by the claims of the application itself.

What is claimed is:

1. An apparatus for providing non-blocking event reporting from a plurality of event reporting units to a monitoring circuit, comprising:

a first common wire coupling said plurality of event reporting units to said monitoring circuit;

a second common wire coupling said plurality of event reporting units to said monitoring circuit;

generating means in each of said plurality of event reporting units for generating a constant level signal on said first wire while an event occurs at a said each event reporting unit;

generating means in each of said plurality of event reporting units for generating a pulse signal on said second wire when an event begins at a said each event reporting unit;

monitoring means in said monitoring circuit for detecting said constant level signal on said first common wire and a first pulse signal on said second common wire from a first event reporting unit to report a first event, and for detecting a second pulse on said second common wire while said constant level signal is applied to said first common wire to report a second event at a second event reporting unit while said first event is still occurring.

2. An apparatus according to claim 1, wherein said constant level signal on said first wire activates said generating means for generating said pulse signal on said second wire when said event occurs at each said event reporting unit.

3. An apparatus according to claim 1, wherein said monitoring means includes a signal detector means for detecting said constant level signal on said first wire, and a pulse detector means for detecting said pulse on said second wire.

4. An apparatus according to claim 3 wherein said monitoring means further includes an alarm means for alerting an attendant when said first event has been detected by said signal detector means, said alarm means capable of being disabled by said attendant;

means for overriding said disabled alarm means when said second pulse signal is detected by said pulse detector means such that said alarm means alerts an attendant that said second event has been detected.

5. A method for non-blocking event reporting from a plurality of event reporting units to a monitoring circuit, comprising the steps of:

(a) providing a first common wire coupling said plurality of event reporting units to said monitoring circuit;

(b) providing a second common wire coupling said plurality of event reporting units to said monitoring circuit;

(c) each of said plurality of event reporting units applying a constant level signal on said first common wire while an event occurs at said event reporting unit;

(d) each of said plurality of event reporting unit applying a pulse signal on said second common wire when an event begins at said event reporting unit;

(e) monitoring said constant level and said pulse signals on said first and second common wire; and (f) reporting events occurring at said plurality of event reporting units according to the following:

(1) reporting a first event when said constant level signal is detected on said first wire and a first pulse signal is detected on said second wire; and (2) reporting a second event even though said constant level signal may be occupying said first common wire when a second pulse is subsequently detected on said second common wire.

6. A method according to claim 5 further comprising the steps of:

activating an alarm for alerting an attendant when said first event is reported after said constant level signal and said first pulse signal are detected;

disabling said alarm;

overriding said disabled alarm when said second pulse signal is detected such that the alarm is reactivated.

* * * * *

UNITED STATES PATENT AND TRADEMARK OFFICE

CERTIFICATE OF CORRECTION

PATENT NO. : 5,155,480

DATED : October 13, 1992

INVENTOR(S) : Greg C. Pfeiffer

It is certified that error appears in the above-identified patent and that said Letters Patent is hereby corrected as shown below:

Column 2, line 4, "Of" should read --of--.

Column 4, line 31, "Fig." should read --Figs.--.

Column 6, line 3, claim 5(d), "unit" should read --units--.

Signed and Sealed this

Twenty-sixth Day of October, 1993

Attest:

BRUCE LEHMAN

Attesting Officer

*Commissioner of Patents and Trademarks*